Feb. 9, 1960      L. L. FERSTANDIG      2,924,619
PRODUCTION OF M-AMINOMETHYLBENZOIC ACID
Filed Sept. 30, 1957
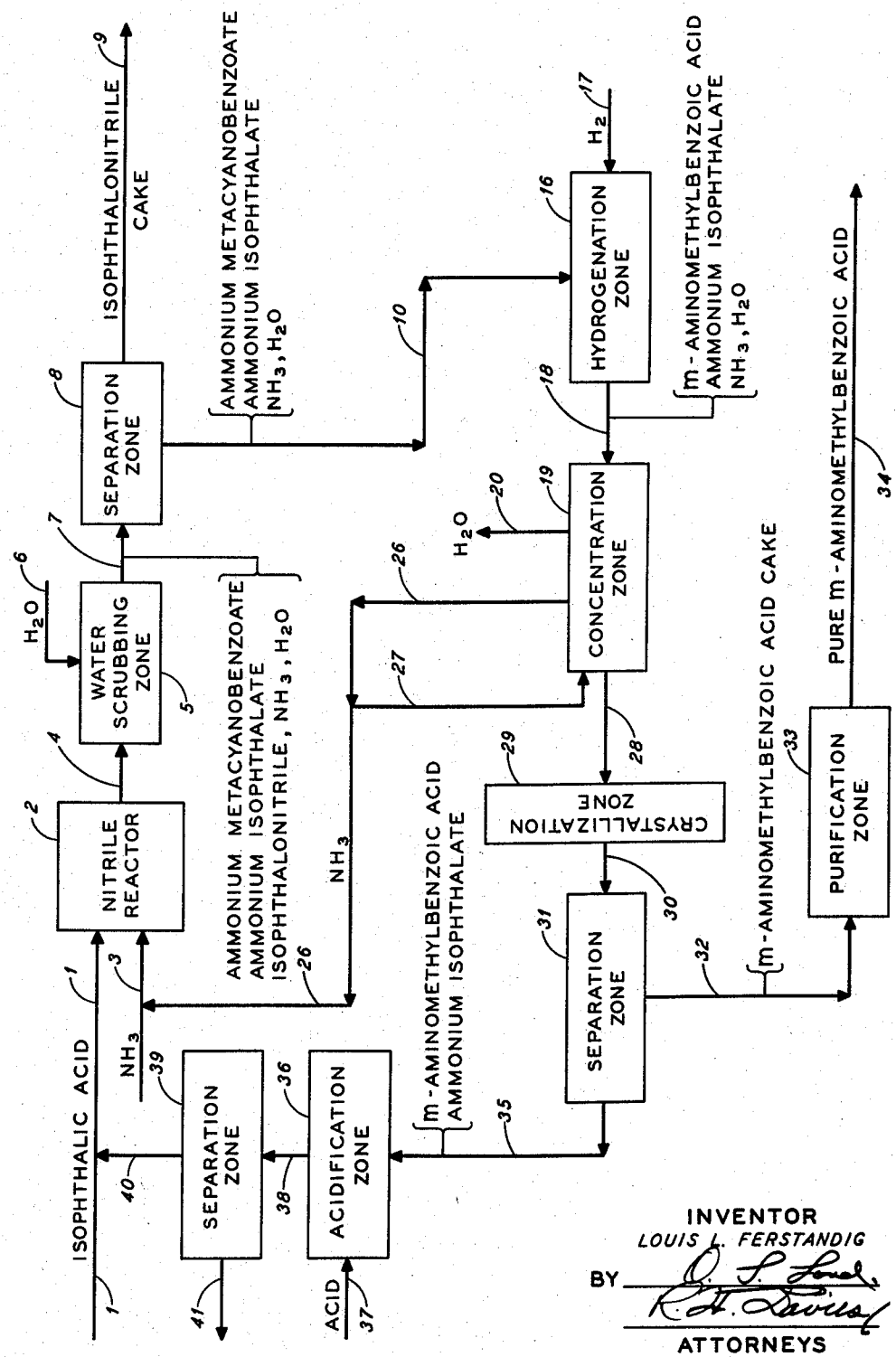
INVENTOR
LOUIS L. FERSTANDIG
BY
ATTORNEYS

United States Patent Office 2,924,619
Patented Feb. 9, 1960

2,924,619

PRODUCTION OF M-AMINOMETHYLBENZOIC ACID

Louis L. Ferstandig, El Cerrito, Calif., assignor to California Research Corporation, San Francisco, Calif., a corporation of Delaware Application September 30, 1957, Serial No. 687,189

7 Claims. (Cl. 260—518)

This invention relates to the production of m-aminomethylbenzoic acid, and more particularly to the production of m-aminomethylbenzoic acid from m-cyanobenzoic acid derived from benzene dicarboxylic acids and ammonia.

The m-aminomethylbenzoic acids prepared according to the process of the present invention are useful as intermediates in the formation of polymers for fibre and molding applications. Polyamides formed from these acids melt at relatively high temperatures and thus have utility in applications where high melting polyamides are desirable.

As disclosed in U.S. Patent 2,678,942, it is known to produce metacyanobenzoic acid by reacting isophthalic acid and ammonia at temperatures above about 340° C. The upper temperature limit is the temperature at which the aromatic dicarboxylic acid commences to decompose, and the patentee discloses that for his purposes about 360° C. is taken as an upper limit. In the disclosed temperature range the formation of the dinitrile is suppressed. The patentee discloses that although isophthalic acid is the preferred starting material, any of the isomers of benzene dicarboxylic acid are operable. His process may be carried out at any pressure, although atmospheric pressure is preferred. Proportions of aromatic dicarboxylic acid and ammonia may vary widely, although generally the amount of ammonia employed is in excess of the stoichiometrical proportions necessary to give the cyanobenzoic acid. The reaction product from such processes is a mixture including ammonia, water, isophthalonitrile, and the ammonium salts of metacyanobenzoic acid and isophthalic acid. From the reaction mixture it is possible to separate out metacyanobenzoic acid and hydrogenate the separated acid to m-aminomethylbenzoic acid. However, such a process heretofore has been unattractive because of the difficulty inherent either in separating the metacyanobenzoic acid from the unreacted isophthalic acid, or in separating the salts of the two acids. Although such separations are possible, the low solubilities of the acids and the small solubility differences between the acids and between the salts have militated against such a route to m-aminomethylbenzoic acid. Further, in conjunction with such separations, it is necessary to remove or neutralize the ammonia present in the reaction mix, thus making it necessary to re-introduce ammonia into the system in the subsequent hydrogenation step, where ammonia is necessary to inhibit undesirable side reactions. It is an object of the present invention to provide a process for the production of m-aminomethybenzoic acid from m-cyanobenzoic acid derived from benzene dicarboxylic acids and ammonia, wherein the necessity for making the above-mentioned difficult separations is circumvented. It is a further object of the present invention to provide an integrated process wherein the ammonia from the initial contacting step is maintained as such in the system, and is carried through the system from said initial contacting step to said hydrogenation step, and the necessity for re-introducing ammonia into the system for the hydrogenation step thereby is eliminated.

In accordance with the present invention, there is provided a process for the production of m-aminomethylbenzoic acid which comprises contacting isophthalic acid with ammonia at a temperature above about 340° C., thereby producing a reaction product comprising ammonia, water, isophthalonitrile, and the ammonium salts of metacyanobenzoic acid and isophthalic acid, hydrogenating said ammonium salt of metacyanobenzoic acid in the presence of said ammonium salt of isophthalic acid to produce m-aminomethylbenzoic acid, and recovering said me-aminomethylbenzoic acid.

The novel features that are characteristic of the present invention are set forth with particularity in the appended claims. The invention will be better understood, however, both as to organization and method of operation, and further objects and advantages thereof will be apparent, from the following detailed description of specific embodiments when read in connection with the accompanying drawing, in which the single figure is a diagrammatic illustration of apparatus and flow paths suitable in carrying out the process of the invention.

Referring now to the drawing, isophthalic acid, desirably in solid granular form, is passed through line 1 into nitrile reactor 2, where it is contacted at above 340° C. with gaseous ammonia supplied to reactor 2 through line 3. In reactor 2 a substantial molar excess of ammonia over isophthalic acid, for example 2–10 mols of ammonia per mol of isophthalic acid, is desirable to produce attractive yields of metacyanobenzoic acid and high conversions of isophthalic acid. The excess ammonia is carried through the system to the subsequent stage wherein metacyanobenzoate is hydrogenated, and is valuable in reducing side reactions during the hydrogenation.

The effluent from reactor 2 is passed through line 4 to water scrubber 5, supplied with water through line 6. Water scrubber 5 serves to cool the reaction mix from reactor 2 and to dissolve the salts of the acids in said reaction mix, while leaving undissolved neutral organic materials including isophthalonitrile.

From water scrubber 5 an effluent including ammonium metacyanobenzoate, ammonium isophthalate, isophthalonitrile, ammonia and water is passed through line 7 to separator 8, which may be, for example, a conventional filter or centrifuge capable of separating isophthalonitrile from the effluent from water scrubber 5. The separated isophthalonitrile may be withdrawn from the system through line 9.

The remaining products from separator 8 are passed in a homogeneous aqueous solution through line 10 to catalytic reduction or hydrogenation zone 16, supplied with hydrogen through line 17. Desirably at least enough hydrogen is supplied to hydrogenation zone 16 to hydrogenate substantially all of the cyano groups in the ammonium metacyanobenzoate to aminomethyl groups, thus producing metaaminomethyl benzoic acid in equilibrium with its ammonium salt. Hydrogenation zone 16 may be operated with a conventional hydrogenation catalyst, for example, a fixed bed or circulating system of Raney nickel. A suitable catalyst flow rate through hydrogenator 16 in a circulating catalyst system is 10 grams of Raney nickel per 100 grams of metacyanobenzoate entering hydrogenator 16. Operating conditions in hydrogenation zone 16 may include temperatures about from ambient to 180° C. and pressures from about atmospheric to about 10,000 p.s.i.g. Above about 180° C. undesired side reactions become serious. Temperatures below about 150° C. and pressures from about 1000 to 5000 p.s.i.g. are preferred.

The effluent from hydrogenation zone 16 is passed through line 18 to concentration zone 19, which may be a conventional heated evaporator serving to separate water and ammonia from the feed thereto. Separated water may be removed through line 20, and separated ammonia may be recycled to line 3 through line 26. Sufficient ammonia may be recycled through line 27 to provide an effluent from zone 19 in line 28 having a pH of about 7.

An effluent from zone 19 is passed through line 28, desirably as a saturated solution of m-aminomethylbenzoic acid, to crystallizing zone 29, where the solution is cooled sufficiently to precipitate m-aminomethylbenzoic acid from the solution.

The effluent from zone 29, including the precipitated amino acid, is passed through line 30 to separator 31, where m-aminomethylbenzoic cake is separated from said effluent. The separated cake may be passed through line 32 to a purification zone 33, which may be a conventional purification zone for accomplishing further purification of the cake if desired. Various methods may be employed in purification zone 33 for purifying the m-aminomethyl-benzoic acid cake, including methods using liquids that will dissolve ammonium isophthalate in preference to m-aminomethylbenzoic acid, for example, water or mixtures of alcohols and water. Exceptionally good results can be obtained using a mixture of two parts isopropyl alcohol to one part water. Purified m-aminomethylbenzoic acid may be recovered through line 34.

From separator 31 the products remaining after separation of m-aminomethylbenzoic acid, including ammonium isophthalate and any residual m-aminomethylbenzoic acid, may be passed through line 35 to acidifier 36, supplied with a mineral acid through line 37. In acidifier 36, isophthalic acid is precipitated from solution, the m-aminomethylbenzoic acid remaining in solution.

From acidifier 36 a slurry comprising said precipitated acid and said amino acid is passed through line 38 to separator 39, from which said precipitated acid may be recycled to reactor 2 through lines 40 and 1.

From separator 39 the solution remaining after precipitation of isophthalic acid is withdrawn through line 41, and may be returned if desired to previous purification stages for recovery of residual m-aminomethylbenzoic acid.

The following tables will further illustrate the process of the present invention.

Table I sets forth yields of metacyanobenzoic acid in the nitrile reactor portion of the system.

TABLE I

*m-Cyanobenzoic acid synthesis at 371–399° C.*

| Run | Reactants (7 lb. IP[1] Total in Each Case) | | NH₃/IP[1] Ratio | Conversion of IP[1] (Percent) | Products | |
|---|---|---|---|---|---|---|
| | IP,[1] mol/hour | NH₃, mol/hour | | | MCBA[2] Yield (mol percent) | IPN[3] Yield (mol percent) |
| 1 | 3.7 | 7.6 | 2/1 | 77 | 29.1 | 30.0 |
| 2 | 4.1 | 10.5 | 2.5/1 | 73 | 47.8 | 21.8 |
| 3 | 4.1 | 11.7 | 2.8/1 | 80 | 36.3 | 23.1 |
| 4 | 4.1 | 11.7 | 2.8/1 | 76 | 31.8 | 23.6 |
| 5[4] | 4.4 | 11.7 | 2.7/1 | 83 | 31.5 | 29.0 |
| 6[5] | 4.1 | 11.7 | 2.8/1 | 77 | 34.0 | 30.8 |
| 7 | 4.9 | 13.9 | 2.8/1 | 75 | 41.0 | 28.4 |
| 8 | 4.6 | 16.0 | 3.5/1 | 76 | 37.8 | 29.2 |
| 9 | 4.1 | 16.0 | 3.9/1 | 82 | 41.7 | 48.0 |

[1] IP is isophthalic acid.
[2] MCBA is m-cyanobenzoic acid.
[3] IPN is isophthalonitrile.
[4] This run was at 343–371° C.
[5] Column packed with ceramic saddles to increase surface.

Table II sets forth results, including hydrogen uptake, in the hydrogen zone portion of the system, using a Raney nickel catalyst.

TABLE II

*Hydrogenation of m-cyanobenzoic acid*

[Room temperature 1500–2000 p.s.i. H₂]

| Run No. | Charge, g. | MCBA,[a] g. (app.) | Raney Ni, g. | Time, Hrs. | H₂ Uptake, percent of Theory |
|---|---|---|---|---|---|
| 1 | 8,000 | 980 | 300 | 25 | 88 |
| 2 | 8,000 | 920 | 200 | 4 | 106 |
| 3 | 8,600 | 1,010 | 225 | 50 | 105 |
| 4 | 9,000 | 880 | 180 | 6 | 89 |
| 5 | 9,000 | 990 | 200 | 64 | 107 |
| 6 | 8,900 | 1,010 | 210 | 6 | 90 |
| 7 | 9,000 | 950 | 200 | 16 | 96 |
| 8 | 4,600 | 450 | 110 | 16 | 139 |
| Total | 65,100 | 7,190 | 1,625 | | 98.5 |

[a] m-Cyanobenzoic acid.

Table III sets forth analyses of m-aminomethylbenzoic acid produced by the process of the present invention, indicating the high purities obtainable.

TABLE III

*Inspections on m-aminomethylbenzoic acid*

| m-Aminomethylbenzoic Acid | Percent C | Percent H | Percent N | Neut. Equiv. |
|---|---|---|---|---|
| Actual | 63.19, 63.21 | 6.02, 6.11 | 9.27, 9.39 | 76.2 |
| Theory | 63.56 | 6.00 | 9.26 | 75.6 |

Yields of m-aminomethylbenzoic acid of about from 80 to 90 mol percent, based on metacyanobenzoic acid, are obtainable with the process of the present invention.

I claim:

1. The method of producing m-aminomethylbenzoic acid which comprises contacting isophthalic acid in a reaction zone with a molar excess of ammonia at temperatures between about 340° C. and 360° C., whereby there is produced a reaction mixture comprising isophthalonitrile and the ammonium salts of metacyanobenzoic acid and isophthalic acid, dissolving said salts of metacyanobenzoic acid and isophthalic acid in said reaction mixture with aqueous ammonia, filtering out said isophthalonitrile, passing the remainder of said reaction mixture to a catalytic hydrogenation zone containing a hydrogenation catalyst, hydrogenating said salt of metacyanobenzoic acid to the ammonium salt of m-aminomethylbenzoic acid at a temperature below about 180° C. in said hydrogenation zone in the presence of said dissolved salt of isophthalic acid and in the presence of ammonia from said reaction zone, reducing the pH of the effluent from said hydrogenation zone to about 7 by evaporating ammonia therefrom, thereby producing a mixture of m-aminomethylbenzoic acid and the ammonium salt of isophthalic acid, and cooling said mixture to precipitate said m-aminomethylbenzoic acid therefrom.

2. The method as in claim 1, wherein said hydrogenation conditions include a pressure of from about atmospheric to 10,000 p.s.i.g.

3. The method as in claim 1, wherein said hydrogenation catalyst is Raney nickel.

4. In the method of producing m-aminomethylbenzoic acid from isophthalic acid by reacting said isophthalic acid with ammonia to produce a mixture containing ammonium at temperatures between about 340° C. and 360° C. metacyanobenzoate and ammonium isophthalate and hydrogenating said ammonium metacyanobenzoate, the improvement comprising conducting said hydrogenation in the presence of said ammonium isophthalate at a temperature below about 180° C. to produce a product mixture containing the ammonium salts of m-aminoethylbenzoic acid and isophthalic acid, adjusting the pH of said product mixture to about 7 by evaporating ammonia therefrom, and cooling said product mixture to precipitate m-aminomethylbenzoic acid therefrom.

5. The method as in claim 4, wherein said precipitated m-aminomethylbenzoic acid is further purified by forming a slurry thereof with a liquid selected from the group consisting of water and mixtures of an alcohol and water which is a solvent for ammonium isophthalate and in which m-aminomethylbenzoic acid is substantially insoluble, and filtering purified m-aminomethylbenzoic acid from said slurry.

6. The method as in claim 4, wherein said hydrogenation conditions include a pressure of from about atmospheric to about 10,000 p.s.i.g.

7. The method as in claim 4, wherein said hydrogenation catalyst is Raney nickel.

References Cited in the file of this patent

UNITED STATES PATENTS 2,678,942     Ferstandig             May 18, 1954

OTHER REFERENCES

Albert et al.: Jour. of the Chem. Soc., London, Part II, p. 678 (1944).

UNITED STATES PATENT OFFICE
CERTIFICATE OF CORRECTION

Patent No. 2,924,619

February 9, 1960

Louis L. Ferstandig

It is hereby certified that error appears in the printed specification of the above numbered patent requiring correction and that the said Letters Patent should read as corrected below.

Column 2, line 17, for "me-aminomethylbenzoic" read -- m-aminomethylbenzoic --; column 4, lines 69 and 70, strike out "at temperatures between about 340° C. and 360° C." and insert the same after "ammonia" in line 68, same column; line 75, for "m-aminoethyl-" read -- m-aminomethyl- --.

Signed and sealed this 25th day of October 1960.

(SEAL)
Attest:

KARL H. AXLINE
Attesting Officer

ROBERT C. WATSON
Commissioner of Patents